Jan. 5, 1932.                R. SALBADOR                1,839,598
                           PIPE COUPLING SEAL
                          Filed March 18, 1930
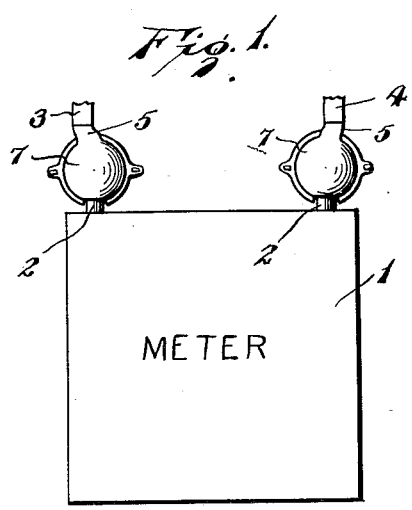
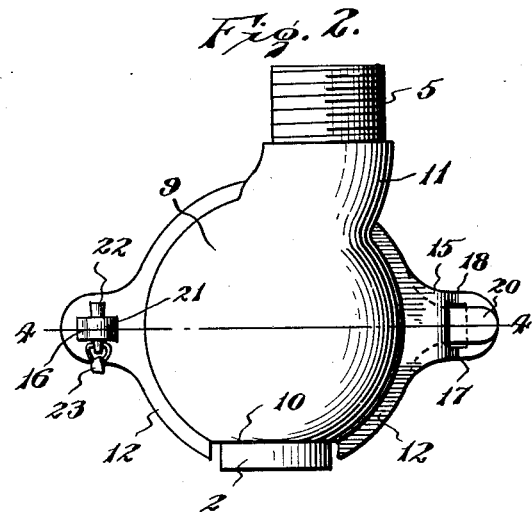
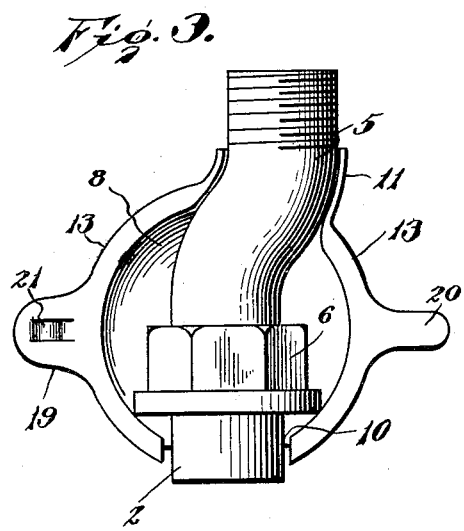
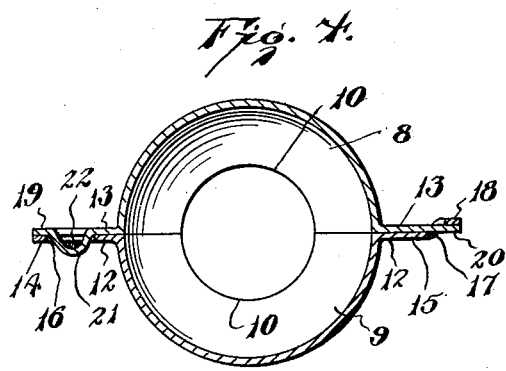
Inventor
R. Salbador
By Lacey & Lacey
Attorneys Patented Jan. 5, 1932

1,839,598

UNITED STATES PATENT OFFICE

RAMON SALBADOR, OF NEW ORLEANS, LOUISIANA

PIPE COUPLING SEAL

Application filed March 18, 1930. Serial No. 436,827.

This invention relates to a protecting seal or casing adapted to be disposed about a coupling which connects a gas meter or the like with a supply pipe leading to the meter and an outlet pipe leading therefrom but it is to be understood that the seal or shield may be secured about a coupling at any point in a pipe line in order to protect the coupling and prevent it from being tampered with by unauthorized or careless persons.

One object of the invention is to provide a shield which may be disposed about a coupling and adjacent portions of pipes connected thereby and not only prevent the coupling from being tampered with but also prevent danger of the coupling being accidentally struck and damaged.

Another object of the invention is to provide a coupling shield consisting of companion sections of such construction that they may be easily applied to each other and secured in enclosing relation to the coupling.

Another object of the invention is to so form the sections of the shield that, while they may be firmly held in engagement with each other and prevented from accidentally slipping out of place, they may be easily released and removed when necessary.

The invention is illustrated in the accompanying drawings, wherein

Figure 1 is a view in elevation showing shields of the improved construction in place about couplings of a meter, Fig. 2 is an enlarged side elevation of the improved shield applied to a coupling.

Fig. 3 is a view showing one section of the shield removed and disclosing the manner in which the shield fits about a coupling, and Fig. 4 is a sectional view taken through the shield on the line 4—4 of Fig. 2 with the coupling removed.

The meter, which is shown in Figure 1 and indicated in general by the numeral 1, is of a conventional construction and is provided with the usual necks or pipes 2 extending therefrom so that the meter may be connected with a supply pipe 3 and service pipe 4. Each of the pipes 3 and 4 carries a nipple 5 which is of curved formation, as shown in Figure 3, and this nipple is securely but removably connected with one of the pipes or necks 2 of the meter by a coupling 6. Persons have been known to disconnect a meter and join the pipes 3 and 4 by a length of hose or pipe having its ends engaged with the couplings 6 and thereby use gas without paying for the same and prevention of this is one of the principal uses for which the shield or seal constituting the subject-matter of this invention is intended.

This seal or shield consists of a hollow body or casing, indicated in general by the numeral 7, and by referring to Figures 3 and 4 it will be seen that the body or casing consists of a pair of sections 8 and 9 which are of a cup-like formation and of such size that when they are applied to each other the casing or body formed thereby may fit about the coupling and adjacent portions of the pipes 2 and 5, as shown in Figure 3. Companion recesses 10 are formed in the marginal portions of the sections 8 and 9 to receive the pipe or neck 2 and the opposite side portions of the sections are formed with extensions 11 which are semi-circular in cross section and cooperate to form a neck which fits about the nipple 5. It should be noted that the neck formed by the extensions 11 is disposed out of alinement with the opening formed by the recesses 10 and is curved longitudinally in order to accommodate the nipple, as shown in Figure 3. By this arrangement turning of the nipple in order to loosen the coupling while the shield is still in place will be prevented. Flanges 12 and 13 extend from the margins of the sections between the recesses 10 and extensions 11 and provide the marginal portions of the sections with wide faces which have flat contacting engagement with each other, as shown in Figure 4. Tongues 14 and 15 project from the flanges 12 of the section 9 at opposite sides of the section and the tongue 14 is cut to form a longitudinally extending opening or slot 16, whereas the tongue 15 is cut to form a transversely extending slot 17 and bent adjacent the inner edge of the slot to form an offset free end portion 18. Companion tongues 19 and 20 extend from the marginal flanges 13 of the section 8, the tongue 20 being straight throughout its length and adapted to be engaged through the opening 17 in the tongue 15 and the tongue 19 being cut to form a strip which is pressed in order to form an eye 21 which fits through the opening 16 in the tongue 14. Therefore, when the shield is applied, the tongue 20 may be engaged through the opening 17 and the two sections moved toward each other until they are disposed in enclosing relation to the coupling with their marginal flanges contacting and the eye 21 engaged through the opening 16. A securing pin 22 may now be passed through the eye and a leaded-wire seal 23 threaded through an opening in the pin or a padlock may be engaged through the eye. The shield will thus be firmly held in place and the couplings cannot be tampered with without detection.

Having thus described the invention, I claim:

1. A coupling shield comprising companion side sections each of a cup-like formation, marginal portions of said sections being recessed to form pipe receiving openings whereby the body may be disposed about a coupling and pipes joined thereby with the pipes extending through the openings, tongues extending from opposite sides of said sections intermediate their recesses and having face to face contact when the sections are united, one section having one tongue formed with an opening and its other tongue transversely slotted and offset between its slot and free end, the other section having one tongue straight throughout its length and engaged through the slotted tongue and its other tongue cut to form a strip, the strip being bent to form an eye passing through the opening in the first tongue of the first-mentioned section and projecting therefrom for engagement by fastening means.

2. A coupling shield comprising companion side sections each of a cup-like formation, marginal portions of said sections being recessed to form pipe receiving openings in said body whereby the body may be disposed about a coupling and pipes joined thereby with the pipes extending through the openings, outstanding flanges extending along margins of said sections between said recesses and at opposite sides of the body being formed with tongues, one section having its tongues formed with slots and the other section having one tongue passed through the slotted corresponding tongue of the first section and its other tongue cut to form a strip bent and forming an eye extending through the slot of the second arm of the first section and adapted to be engaged by a fastener.

3. A coupling shield comprising companion side sections having opposed recesses to form pipe receiving openings in said body when the sections are disposed one against the other, opposed portions of the sections being provided with outstanding tongues disposed at opposite sides of the body with the tongues of one section abutting tongues of the other section, one section having its tongues formed with slots and the other section having one tongue passed through the slotted corresponding tongue of the first section and its other tongue cut to form a strip, the strip being bent to form an eye extending through the slot of the second arm of the first section and projecting therefrom for engagement by a fastener.

In testimony whereof I affix my signature.

RAMON SALBADOR. [L. S.]